United States Patent [19]
Schlüter

[11] Patent Number: 5,814,284
[45] Date of Patent: Sep. 29, 1998

[54] PLANT FOR THE REDUCTION OF NITROGEN OXIDE IN FURNACE WASTE GASES

[75] Inventor: Siegfried Schlüter, Wenden-Rothemühle, Germany

[73] Assignee: Apparatebau Rothemuhle Brandt & Kritzler Gesellschaft mit beschrankter Haftung, Wenden-Rothemuhle, Germany

[21] Appl. No.: 816,488

[22] Filed: Mar. 13, 1997

Related U.S. Application Data

[63] Continuation of Ser. No. 554,391, Nov. 6, 1995, abandoned, which is a continuation of Ser. No. 234,137, Apr. 28, 1994, abandoned.

[30] Foreign Application Priority Data

Apr. 28, 1993 [DE] Germany .................... 43 13 861.6

[51] Int. Cl.⁶ .................... B01D 53/34; F01N 3/10
[52] U.S. Cl. .................... 422/175; 422/171; 422/172; 422/173; 422/177; 165/7
[58] Field of Search .................... 422/171–173, 422/175, 198, 206, 209; 165/5, 7, 8–10; 110/254; 432/181; 423/239.1, 235

[56] References Cited

U.S. PATENT DOCUMENTS

| | | | |
|---|---|---|---|
| 4,678,643 | 7/1987 | Fetzer | 165/8 |
| 5,145,652 | 9/1992 | Veser et al. | 422/171 |
| 5,237,939 | 8/1993 | Spokoyny et al. | 165/7 |
| 5,275,230 | 1/1994 | Balling et al. | 422/173 |

FOREIGN PATENT DOCUMENTS

| | | | |
|---|---|---|---|
| 663669 | 4/1987 | Australia | F23J 15/00 |
| 226731 | 7/1987 | European Pat. Off. | |
| 502443 | 9/1992 | European Pat. Off. | |
| 8424417 | 8/1986 | Germany. | |
| 92/17267 | 10/1992 | WIPO. | |

OTHER PUBLICATIONS

"Design & Arrangement" pp. 22–23 (submitted by Applicant).

Primary Examiner—Hien Tran
Attorney, Agent, or Firm—Friedrich Kueffner

[57] ABSTRACT

A plant for the reduction of nitrogen oxide in furnace waste gases includes a furnace, a reactor serving for selective catalytic reduction, and a regenerative heat exchanger to be used for air preheaters as well as for gas preheaters for the treatment of pollutant-containing waste gases which are in a heat exchange with another medium. The regenerative heat exchanger has stationary or revolving storage masses which are composed at least partially of catalytic material. A reduction agent is supplied to the regenerative heat exchanger. The reactor is arranged concentrically above the regenerative heat exchanger. Preferably, the reactor is placed directly onto the housing of the heat exchanger.

2 Claims, 5 Drawing Sheets

5,814,284

PLANT FOR THE REDUCTION OF NITROGEN OXIDE IN FURNACE WASTE GASES

This is a continuation of application Ser. No. 08/554,391, filed Nov. 6, 1995, now abandoned, which is a continuation of application Ser. No. 08/234,137 filed Apr. 28, 1994, now abandoned.

BACKGROUND OF THE INVENTION

1. Field of the Invention

The present invention relates to a plant for the reduction of nitrogen oxide in furnace waste gases. The plant includes a furnace, a reactor serving for selective catalytic reduction, and a regenerative heat exchanger to be used for air preheaters as well as for gas preheaters for the treatment of pollutant-containing waste gases which are in a heat exchange with another medium. The regenerative heat exchanger has stationary or revolving storage masses which are composed at least partially of catalytic material. A reduction agent is supplied to the regenerative heat exchanger.

2. Description of the Related Art

In plants of the above-described type for removing nitrogen from flue gases in power plants and industrial furnaces, regenerative heat exchangers for waste gases which are either desulfured or not yet desulfured and are supplied from a steam generator or a desulfurization plant, are used for preheating the combustion air. The nitrogen oxides ($NO_x$) contained in the waste gas can be substantially reduced by constructing the stationary or revolving storage masses of the regenerative heat exchanger so as to be either partially or entirely catalytically effective, and by adding, for example, primarily ammonia ($NH_3$) as a reduction agent. Thus, the process carried out is a selective catalytic reduction (SCR) of nitrogen oxides in which the reduction or deoxidation of the nitrogen oxides is effected by adding $NH_3$ in the presence of a catalyst integrated into the regenerative heat exchanger (gas preheater or air preheater). As a rule, the $NO_x$-containing gas is the flue gas of a furnace which flows at the end of a steam generator through the regenerative heat exchanger for preheating the combustion air.

In the selective catalytic reduction of nitrogen oxides in the waste gases of furnaces, it is known to add $NH_3$ to the waste gases emerging from the furnace in the form of vapor, or as a mixture with air as a carrier gas under pressure or dissolved in water without pressure. The $NH_3$ is introduced on the crude gas side or on the clean gas side. Accordingly, the $NH_3$ is admixed to the flue gas either before it enters the catalyst or to the fresh air to be heated before it enters the catalyst, or, in a combination of both possibilities, is added to both sides. Mixing segments with appropriate fittings within the downstream waste gas ducts are used in an attempt to obtain a streak-free ammonia distribution and temperature distribution in the waste gas flow to the entry in the catalyst. For taking into consideration optimum reaction temperatures within the waste gas flow, the catalyst, i.e., a reactor containing catalyst cells arranged in superimposed layers, is arranged in front of the regenerative heat exchanger for transferring the waste gas heat to the combustion air to be supplied to the furnace.

Particularly useful catalysts have proved to be fixed-bed catalysts with vertically downwardly directed waste gas flow, wherein the waste gases from which nitrogen is to be removed is supplied alternatingly to several of the catalysts. The fixed-bed catalysts are of web-type construction and contain vanadium compounds as catalytically acting substances, wherein the vanadium compounds favorably influence the conversion of the nitrogen oxides with the $NH_3$ which has been previously conducted into the waste gas flow and has been mixed and finally distributed in the waste gas flow on the way to the catalyst. The reaction with the nitrogen oxides contained in the waste gases essentially results in molecular nitrogen and water as reaction products which then can be harmlessly conducted into the atmosphere.

Additional details and the conventional method for the selective catalytic reduction of nitrogen oxides and a plant of the above-described type are disclosed in European patent 0 226 731. Two types of plants are known from this European patent. In the first case, the reactor is arranged in front of the regenerative heat exchanger constructed as an air preheater in the so-called high dust position in which the waste gas to be treated still contains flue dust. In the second case, the reactor is arranged following the dust removal and the flue gas desulfurization and the reactor is connected to a regenerative heat exchanger constructed as a gas preheater. The connection of the subsequently arranged reactor with a gas preheater is required for obtaining the necessary reaction temperature for the SCR-process, i.e., the selective catalytic reduction. In the high dust position as well as in the subsequently arranged position, the reactor is an individual component arranged above the air preheater or gas preheater, wherein the reactor requires its own support structures and the necessary connecting ducts.

SUMMARY OF THE INVENTION

Therefore, it is the primary object of the present invention to further develop a plant of the above-described type in such a way that the reduction of nitrogen oxides in flue gases can be carried out technically effectively and cleanly while requiring a less complicated construction.

In accordance with the present invention, the reactor is arranged concentrically above the regenerative heat exchanger. Preferably, the reactor is placed directly onto the housing of the heat exchanger.

The concentric arrangement of the catalysts of the reactor in relation to the regenerative heat exchanger facilitates an optimum gas conveyance under favorable flow conditions and the pressure losses are reduced to a minimum. The placement of the reactor on the air preheater or gas preheater results in a compact construction which makes it possible to support the weight of the components by a common structure, so that an additional separate structure, i.e., an otherwise substantial frame, can be omitted. As a result, it is possible to reduce construction material and, thus, the weight of the structures. In addition, it is easier to construct the plant and the space required for the plant is also reduced.

In a plant which includes a regenerative heat exchanger with revolving blade or vane hoods or domes, a feature of the present invention provides that the two blade hoods are offset relative to each other by 90°. This results in a so-called semi-inverted hood arrangement which provides the advantage that an accelerated flow exists within each of the hoods, so that, compared to conventional arrangements, the pressure loss is smaller. For example, in an air preheater, the fact that the two revolving blade hoods which control the gas exchange are offset relative to each other means that air entering from below flows around the lower blade hood, and through the upper blade dome or hood after emerging from the heating surfaces of the air preheater. In a similar manner, the crude or waste gas supplied in a counterflow flows around the upper blade hood after emerging from the reactor, i.e., at the entry of the regenerative air preheater, and through the lower blade hood at the exit side of the air preheater.

In accordance with a further development of the invention, the regenerative heat exchanger is provided with catalyst cells. The compact structure of the plant resulting from combining a reactor with a regenerative air preheater or gas preheater in a common space can be further advantageously influenced by placing a layer of catalyst cells, which would ordinarily be accommodated in the reactor, in the regenerative heat exchanger. By mounting the catalyst elements in the stators of, for example, regenerative air preheaters, it becomes possible that the stators act as heating and reaction surfaces. The catalyst cells which are integrated in the air preheater and simultaneously act as heating surfaces or storage masses make it possible as a result of the achieved division into a reactor area and a heat exchanger area, to effectively adapt the operating conditions of the catalysts, particularly when taking into consideration the temperatures and dwell times which determine the reaction. In particular, an injection of the reduction agent can be advantageously influenced; for example, in an air preheater, $NH_3$ can be supplied also from the air side through a special sector.

Therefore, another feature of the present invention recommends to arrange injection nozzles for the reduction agent on the crude gas side or the clean gas side of the heat exchanger. In a regenerative heat exchanger constructed as a gas preheater, such as a reactor arranged downstream of a flue gas desulfurization unit, the reduction agent can then be additionally introduced as desired through a separate sector between the clean gas phase and the crude gas phase into the catalytic storage mass cells which are integrated in the gas preheater. If the regenerative heat exchanger is constructed as an air preheater, the reduction agent can be introduced on the crude gas side as well as on the clean gas side. A specific and well metered addition of the reduction agent at the best suitable locations of the catalysts of the reactor as well as of the regenerative heat exchanger results in an optimization of the reduction of nitrogen oxide and, thus, causes a minimization of the slippage of non-utilized reduction agent.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
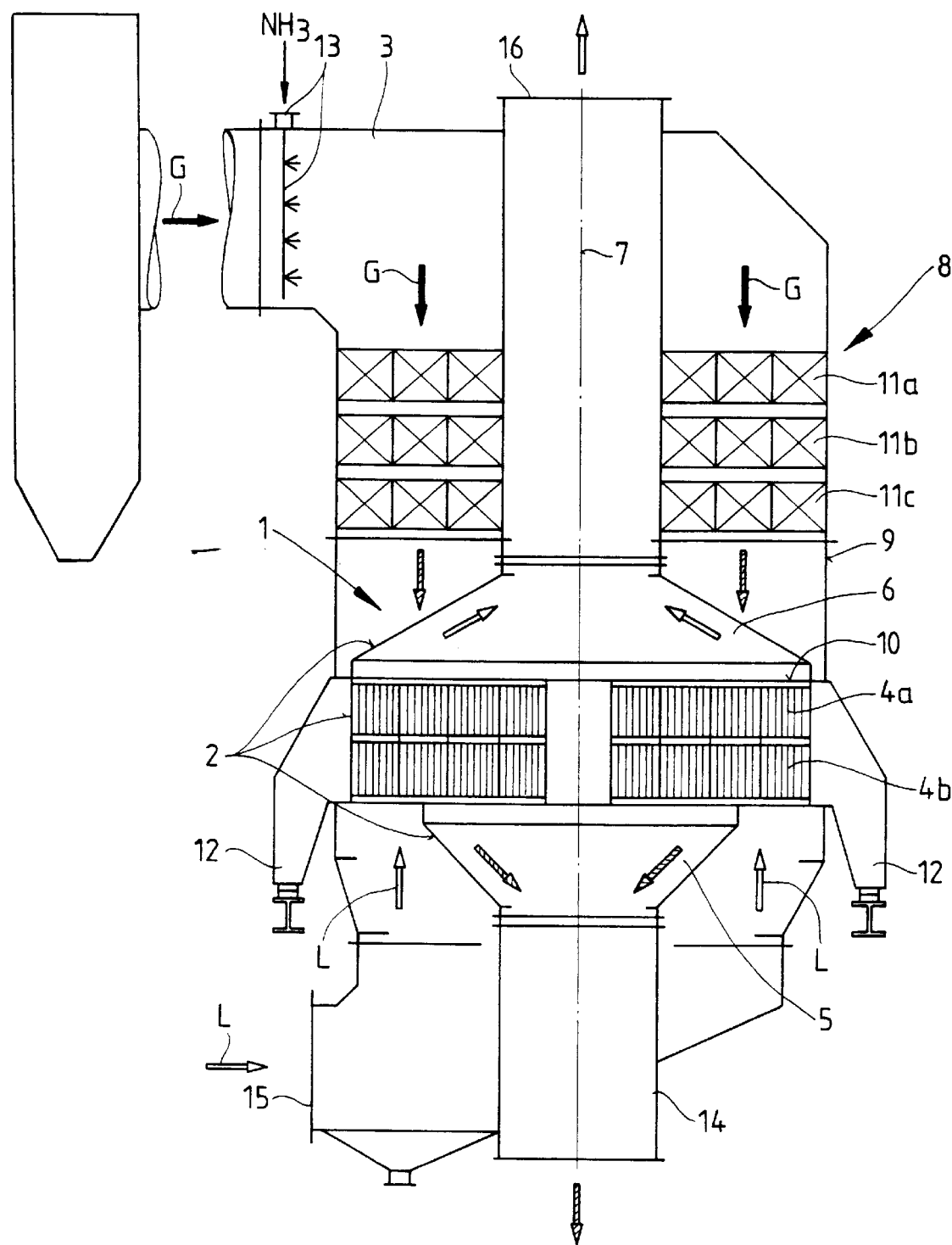
FIG. 1 is a schematic illustration of a reactor which, in accordance with the present invention, is concentrically placed on a regenerative heat exchanger constructed as an air preheater, wherein the reactor and heat exchanger are a unit of a plant for the reduction of nitrogen oxide in furnaces, not shown in detail.

FIG. 1 of the drawing shows a regenerative heat exchanger 1 constructed as an air preheater 2. $NO_x$-containing hot waste gas is conducted to the heat exchanger 1 through a duct 3 from a furnace or steam producer, shown on the left hand side of FIG. 1. Accordingly, the hot crude gas G, in the following called gas for short, flows from the top into the air preheater 2 which has in the middle portion thereof a heat accumulator composed of two layers of heating surfaces 4a, 4b arranged one on top of the other. Segmented blade hoods 5, 6 are arranged underneath the lower layer 4b of the heating surfaces and above the upper layer 4a of the heating surfaces respectively. The blade hoods 5, 6 are offset relative to each other by 90° and rotate together about a vertical axis 7.

A reactor 8 is arranged in front of the air preheater 2 or regenerative heat exchanger 1. The reactor 8 is with its housing 9 placed directly on the air preheater housing 10. Specifically, the reactor is placed with its three layers of catalyst cells 11a, 11b, 11c, which are arranged above each other, concentrically above the air preheater 2. The resulting compact structural unit composed of reactor 8 and regenerative heat exchanger 1 is supported by a common support frame 12 which, in turn, is placed on a foundation.

After entering the duct 3, the incoming gas G initially reaches the catalyst cells 11a, 11b, 11c of the reactor 8 and a $NO_x$ reduction is effected by adsorption as the gas G travels through the catalyst cells 11a to 11c. To be able to achieve the $NO_x$ reduction, $NH_3$ is introduced as a reduction agent together with preheated carrier air through a supply pipe 13 into the reactor 8 or its catalyst cells 11a through 11c. Accordingly, the gas G emerging from the lowermost layer of catalyst cells 11c as seen in the direction of flow is free of nitrogen oxides, which is indicated by arrows provided with hatching in the areas where gas emerges. The gas enters as clean gas into the storage masses of the heating surfaces 4a, 4b of the air preheater. As a result of the fact that the blade hoods 5, 6 are arranged offset relative to each other by 90°, the clean gas flows around the upper blade hood 6, enters the heating surfaces 4a, 4b, heats the heating surfaces 4a, 4b, the gas is cooled as a result and is subsequently conducted in purified form through the duct 14 which is connected at the bottom.

A pipe 15 is connected to the lower end of the air preheater 2. Clean, cold combustion air L, in the following called air for short, is conducted in a counterflow to the gas G to the heated heating surfaces 4a, 4b of the air preheater 2. As a result of the fact that the blade hoods 5, 6 are offset relative to each other, the air L flows around the lower blade hood 5 before it enters the heating surfaces 4a, 4b and is subsequently conducted as hot air to the furnace through the upper blade hood 6 and a duct 16 connected to the hood 6. As a result of the rotation of the blade hoods 5, 6, continuously changing parts of the heating surfaces 4a, 4b of the air preheater 2 are subjected to the hot clean gas or the supplied air L.

Figure 2:
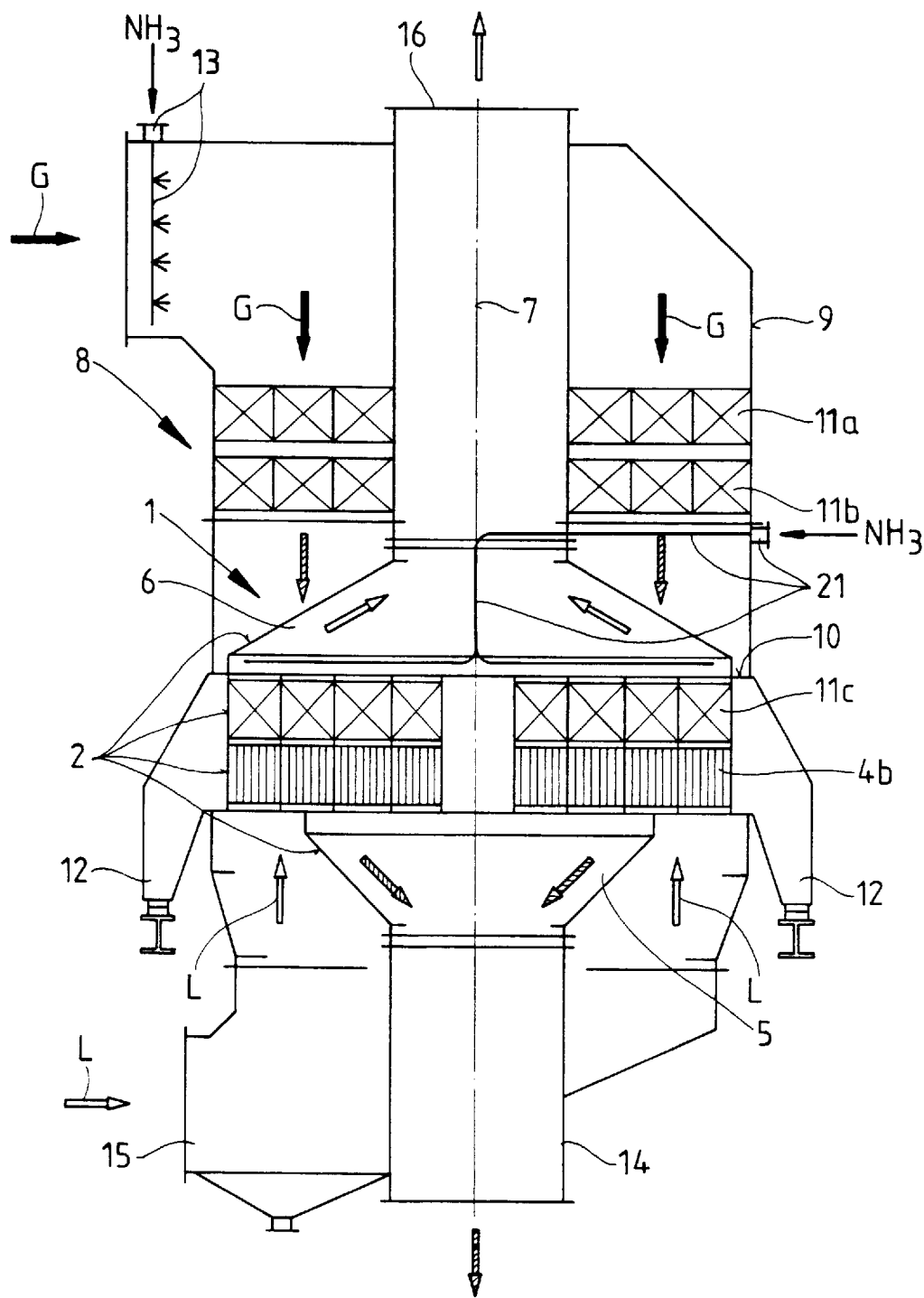
FIG. 2 is a schematic illustration of the reactor and heat exchanger combination of FIG. 1, wherein catalyst cells are integrated in the air preheater.

FIG. 2 of the drawing shows a modification of the structural unit shown in FIG. 1. Accordingly, the same components are provided with the same reference numerals.

Contrary to the embodiment of FIG. 1, the lowermost layer of the catalyst cells 11c seen in flow direction of the gas G have been taken out of the reactor 8 and are now an integrated component of the regenerative air preheater 2. As a result, the reactor 8 concentrically mounted on the housing 10 of the air preheater 2 now only has two layers of catalyst cells 11a, 11b, while the catalyst cells 11c represent an integrated component of the air preheater 2 and are arranged in the air preheater 2 above the heating surfaces 4b. By dividing the air preheater 2 into a reactor portion, i.e., the catalyst cells 11c, and a heat exchanger portion, i.e., the heating surfaces 4b, it is possible to optimize various possibilities of supplying $NH_3$. Thus, the $NH_3$ can be injected on the gas side through the supply pipe 13 as well as on the air side through the supply pipe 21, for example, through a closed sector, not shown, which conducts the $NH_3$ as desired to the catalyst cells 11c.

Figure 3:
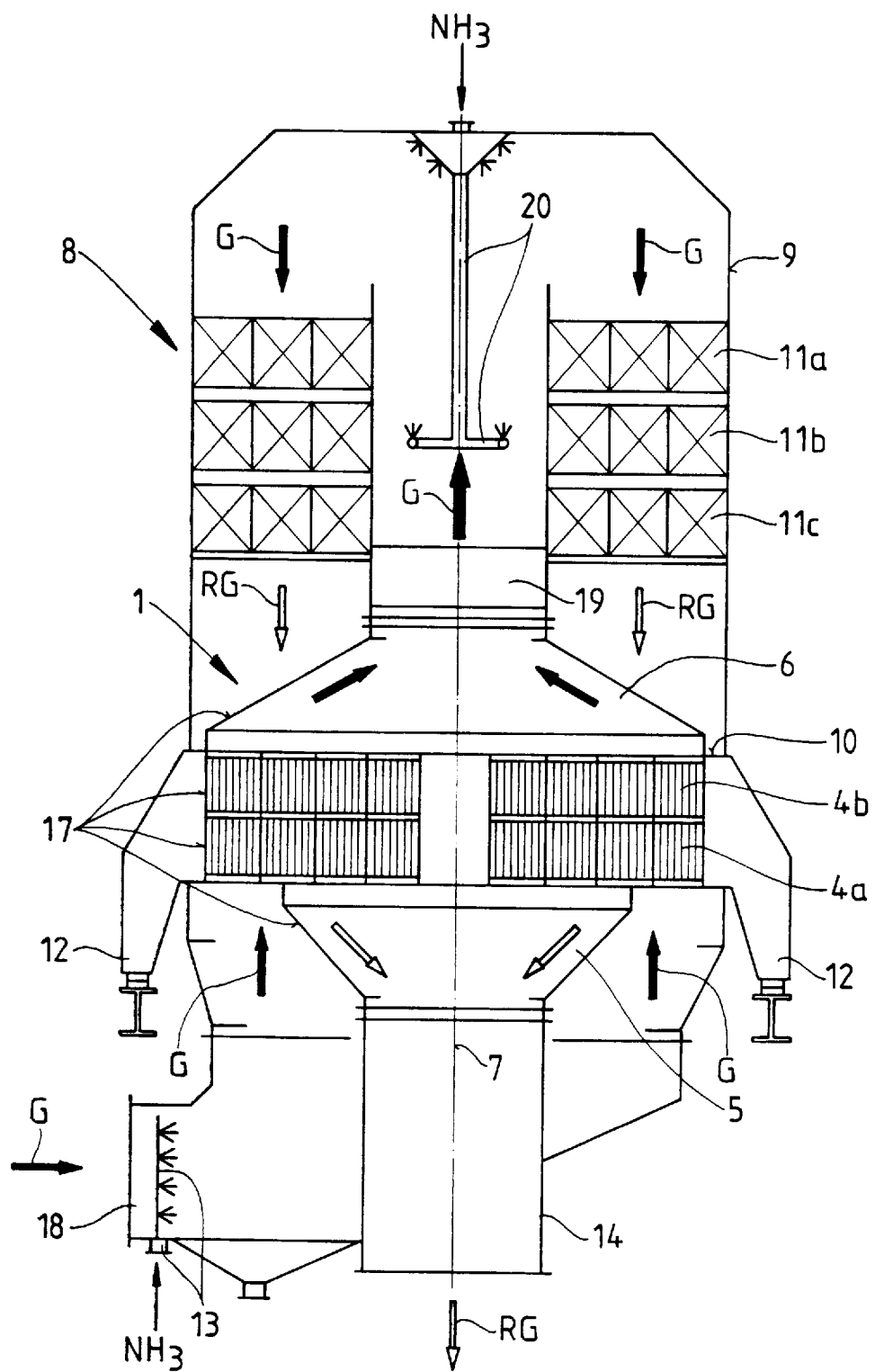
FIG. 3 is a schematic illustration of a reactor arranged concentrically on a regenerative heat exchanger, wherein the heat exchanger is a gas preheater.
Figure 4:
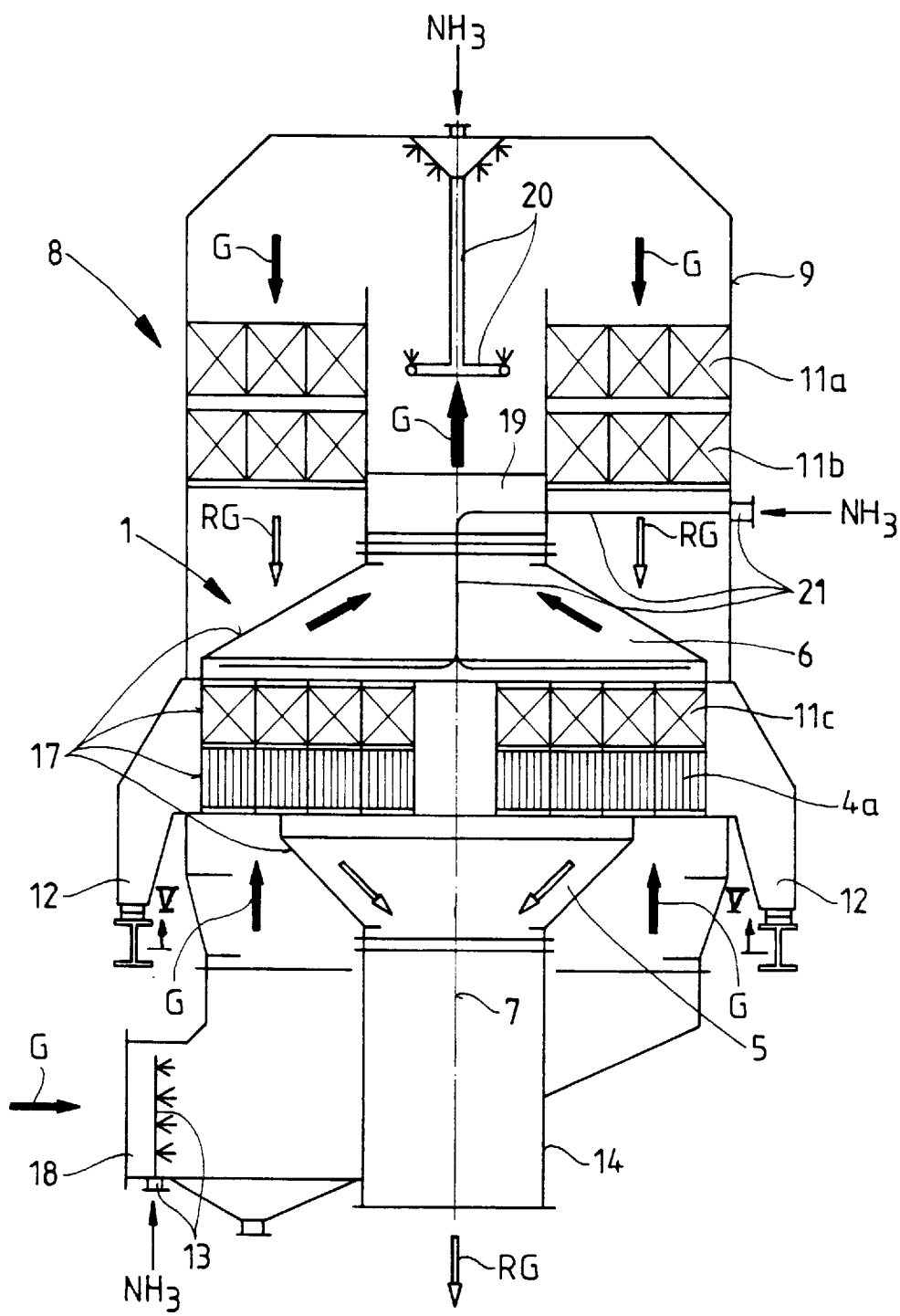
FIG. 4 is a schematic illustration of the reactor and heat exchanger combination of FIG. 3, wherein catalyst cells are integrated in the gas preheater.
Figure 5:
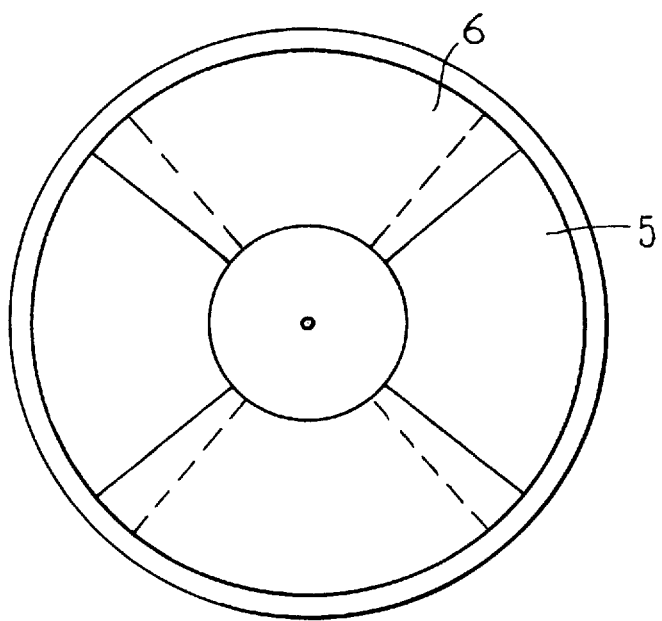
FIG. 5 is a sectional view taken along sectional line V—V of FIG. 4.

The compact structural unit illustrated in FIGS. 3 and 4 and achieved by placing the reactor 8 concentrically on the housing 10 of the heat exchanger, is provided with a regenerative heat exchanger 1 which operates as a gas preheater 17 in as much as it is arranged following a flue gas desulfurization plant within the plant for the reduction of nitrogen oxide; otherwise, as is the case for the other components of the combined structural unit, the plant is essentially the same as the embodiment of FIGS. 1 and 2, so that the same components are provided with the same reference numerals. From the flue gas desulfurization plant, not shown, the cold gas G flows as crude gas through a duct 18 into the heating surfaces 4a, 4b of the gas preheater 17 and the heating surfaces 4a, 4b are cooled as a result. The gas G emerging from the gas preheater 17 through the upper blade hood 6 is conducted through an additional heating unit 19, at a temperature necessary for the reaction, in a counterflow through the catalyst cells 11a, 11b, 11c of the reactor 8 and leaves the reactor 8 as purified gas RG, as indicated by white arrows. Subsequently, the hot purified gas RG flows around the upper blade hood 6, is then introduced into the heating surfaces 4a, 4b of the gas preheater 17, is cooled, and then conducted further through the lower blade hood 5 and the discharge duct 14 to the chimney. In this case, the reduction agent ($NH_3$) is introduced from the crude gas side at one point through the supply pipe 13 and additionally through another reduction agent injection nozzle 20.

In the compact structural unit shown in FIG. 4 of the reactor 8 concentrically mounted on the regenerative heat exchanger 1 or the gas preheater 17, the gas preheater 17 has an integrated layer of catalyst cells 11c, as shown in FIG. 3, so that the reactor 8, instead of three layers of catalyst cells arranged above each other, merely has the two layers of catalyst cells 11a, 11b.

Similar to the possibilities of injecting the reduction agent described in connection with FIG. 2, the gas preheater 17 also has optimum variations for supplying the $NH_3$, wherein the $NH_3$ can be injected on the gas side through the supply pipes 13 and 20 as well as from the purified gas side through a supply pipe 21, for example, through a closed sector, not shown, which conducts the $NH_3$ as desired to the catalyst cells 11c. The operation of the embodiment of FIG. 4 does otherwise not differ from the operation of the embodiment described in connection with FIG. 3.

In particular, all embodiments have in common that the concentric symmetry of regenerative heat exchanger 1 (air preheater 2 or gas preheater 17, and reactor 8) produces an improved flow through the unit and variable possibilities of injecting the reduction agent. By combining the components in one space, it becomes possible that the catalysts or the reactor 8 can be placed directly on the regenerative heat exchanger. This reduces the weight and the dimensions of the unit.

The invention is not limited by the embodiments described above which are presented as examples only but can be modified in various ways within the scope of protection defined by the appended patent claims.

I claim:

1. In a plant for the reduction of nitrogen oxide in furnace waste gases, the plant including a furnace, a reactor for a selective catalytic reduction, means for conducting waste gases in a waste gas flow from the furnace to the reactor, the reactor including at least one layer of catalyst cells, a regenerative heat exchanger mounted separately from the reactor, the regenerative heat exchanger adapted for use as one of an air preheater and a gas preheater for the treatment of the waste gases which contain pollutants, the regenerative heat exchanger having a housing containing at least one of stationary storage masses and revolving storage masses, said housing including an upper blade hood and a lower blade hood, and means for supplying a reduction agent to the waste gas flow in the conducting means in front of the at least one layer of catalyst cells, wherein the improvement comprises that the catalyst cells are mounted on a waste gas side above the upper blade hood of the heat exchanger housing in a reactor housing which is separate from the housing of the heat exchanger, that the reactor housing is mounted concentrically above the regenerative heat exchanger, and that the reactor housing is mounted on and supported by the housing of the heat exchanger, so that the reactor and the regenerative heat exchanger form a unit, the unit being supported by a common support frame placed on a foundation.

2. The plant according to claim 1, wherein the upper and lower blade hoods of the regenerative heat exchanger housing are offset relative to each other by 90°.

\* \* \* \* \*